(12) United States Patent
Wolf et al.

(10) Patent No.: US 7,387,726 B2
(45) Date of Patent: Jun. 17, 2008

(54) LIQUID FILTER SYSTEM

(75) Inventors: Michael Wolf, Neunkirchen (DE); Joachim Stinzendoerfer, Speyer (DE); Karlheinz Muenkel, Oberderdingen-Flehingen (DE); Ralf Bauder, Ketsch (DE); Norbert Maurer, Speyer (DE)

(73) Assignee: Mann & Hummel GmbH, Ludwigsburg (DE)

( * ) Notice: Subject to any disclaimer, the term of this patent is extended or adjusted under 35 U.S.C. 154(b) by 306 days.

(21) Appl. No.: 11/354,169

(22) Filed: Feb. 15, 2006

(65) Prior Publication Data

US 2006/0180539 A1 Aug. 17, 2006

Related U.S. Application Data

(60) Provisional application No. 60/666,197, filed on Mar. 30, 2005.

(30) Foreign Application Priority Data

Feb. 15, 2005 (DE) .................. 10 2005 007 024

(51) Int. Cl.
*B01D 27/08* (2006.01)
*B01D 35/30* (2006.01)
(52) U.S. Cl. .............. 210/232; 210/443; 210/450; 210/238

(58) Field of Classification Search ............ 210/232, 210/238, 443, 450
See application file for complete search history.

(56) References Cited

U.S. PATENT DOCUMENTS

| 2,991,885 | A | * | 7/1961 | Janusz ................... 210/133 |
| 4,052,307 | A | * | 10/1977 | Humbert, Jr. .......... 210/130 |
| 4,764,275 | A | * | 8/1988 | Robichaud .............. 210/232 |
| 4,915,831 | A | * | 4/1990 | Taylor ..................... 210/232 |
| 5,035,797 | A | * | 7/1991 | Janik ....................... 210/232 |
| 5,336,406 | A | * | 8/1994 | Stanford et al. ........ 210/235 |
| 5,826,854 | A | * | 10/1998 | Janvrin et al. ......... 251/149.9 |
| 6,001,249 | A | * | 12/1999 | Bailey et al. ............ 210/232 |
| 6,004,462 | A |   | 12/1999 | Yamada et al. |

FOREIGN PATENT DOCUMENTS

DE 196 26 060 A1 1/1997

* cited by examiner

*Primary Examiner*—Thomas M. Lithgow
(74) *Attorney, Agent, or Firm*—Crowell & Moring LLP (57) ABSTRACT

An oil filter for an internal combustion engine with a cup-shaped housing that is releasably connectable to a receiving head. The housing has a first interlocking element that extends across at least a portion of the outer circumference of the housing and is interrupted by at least one axially extending recess. The filter element has a liquid-tight canister provided on its outer surface with second interlocking elements, which fit into the recesses of corresponding first interlocking elements when the filter element is installed in the housing.

13 Claims, 7 Drawing Sheets

LIQUID FILTER SYSTEM

BACKGROUND OF THE INVENTION

The present invention relates to a liquid filter system, preferably an oil filter for an internal combustion engine, comprising a cup-shaped housing that is releasably connectable to a receiving head and a filter element disposed inside the housing.

Two types of fluid filters, particularly oil filters for internal combustion engines, are known in the art. On the one hand, so-called spin-on filters are used. A spin-on filter has a cup-shaped housing, a filter element non-releasably disposed therein, and a threaded end plate. The cup-shaped housing is made of metal, so that it can withstand the pressure pulsation occurring in the interior of the filter during operation of the internal combustion engine. The spin-on filter is screwed onto a receiving flange, or directly onto the engine block of the internal combustion engine, and during servicing is completely replaced with a new spin-on filter. This filter system has drawbacks, however, resulting from the material mix of the filter, because a mixture of plastics, paper, and metal must be disposed of, and separation of the various materials for disposal is problematic.

On the other hand, so-called oil modules are known in the art, in which a filter element is releasably disposed in a preferably cup-shaped housing and can likewise be screwed onto a receiving head disposed in the circuit by means of this housing. For servicing, only the metal-free filter cartridge needs to be replaced, whereas the cup-shaped housing is a lifetime component.

German Utility Model No. 200 04 31 U1 discloses a liquid filter with a bypass valve. A hollow cylindrical filter element is releasably disposed within a cup-shaped housing, and the cup-shaped housing is screwed into a connection head. A support tube, which receives the bypass valve, is disposed concentrically within the interior of the filter element. The drawback here lies in the changing of the filter element. There is a risk that the immediate surroundings of the oil filter element may be contaminated because the oil-soaked filter medium still contains a residual amount of oil, which may drip as the filter element is replaced. A further drawback is that the hands of the service personnel may become soiled by the direct contact with the oil-soaked filter element.

Another drawback is that it is not clear without closer inspection during installation of the outer housing whether a filter element is installed at all. This can be determined only by looking at the open underside of the housing, but in most cases this side has to be mounted face down, is inaccessible in an engine compartment, hidden, etc.

SUMMARY OF THE INVENTION

It is therefore an object of the invention to provide an improved liquid filter particularly suitable for filtering lubricating oil or fuel of an internal combustion engine.

Another object of the invention is to provide a filter system comprising a receiving head, a cup-shaped housing releasably attached to the receiving head and a filter element disposed within the housing in which the filter cartridge and the housing can be installed easily and in the correct position relative to each other.

A further object of the invention is to provide a liquid filter system in which it is clearly visible on the outer surface whether a filter element is installed in the housing.

A additional object of the invention is to provide a liquid filter system of the aforementioned type in which attachment of the releasable housing to the receiving head is prevented if a filter element is not properly installed in the housing.

These and other objects are achieved in accordance with the present invention by providing a liquid filter system comprising receiving head, a cup-shaped housing releasably connectable to the receiving head, and a filter element disposed inside the housing, wherein the housing is provided with a plurality of first interlocking elements that extend across at least a portion of the outer circumference of the housing or across a lower edge of the housing, each said interlocking element being interrupted by at least one axially extending recess or having a laterally adjoining axially extending recess, and wherein said filter element comprises a canister provided on an outer surface thereof or at a lower edge thereof with a plurality of second interlocking elements which are received in the axially extending recesses of the first interlocking elements when the filter element is installed in the housing.

The present invention thus relates to a liquid filter system in which:

the housing is provided with first interlocking elements that extend across at least a portion of the outer circumference and/or the bottom edge of the housing;

the interlocking elements are each interrupted by at least one axially extending recess, or each have a laterally adjoining axially extending recess, and the filter element has a, preferably liquid-tight, canister which is provided on its exterior and/or its bottom edge with second interlocking elements, which as the filter element is inserted into the housing, are received in the axial recesses in the first interlocking elements.

With a liquid-tight canister, the filter element can be easily and cleanly removed from the housing in the form of a replaceable insert. A new filter element is positioned correctly, i.e., with respect to both the angular position of the two components in relation to each another and their axial position, because the second interlocking elements on the canister of the filter element mate or mesh with the recesses on the first interlocking elements of the housing.

The absence of a filter element on the inside would be visually detectable by an operator because in this case the recesses in the first interlocking element of the housing would not be filled in.

Because the first and second interlocking elements complement each other to form a uniform interlocking element, the filter element and the housing are simultaneously connected or latched to the receiving head of the liquid filter system.

In a preferred embodiment, the first and second interlocking elements complement each other to form a web with an inclined cam surface on the outer circumference of the housing. These webs can be inserted into arcuate recesses in the receiving head and then twisted relative to each other through a specific angle, so that the webs and the arc-shaped recesses produce a bayonet connection between the receiving head and the housing containing the filter element. The inclined cam surface causes axial locking when it slides under a corresponding projection on the receiving head. Thus, with a slight rotation, the housing, including the filter element, is clamped against the receiving head and sealed, so that the filter system is ready for use. At the same time, the inlet and outlet channels disposed on the receiving head are coupled to the corresponding flow passages in the filter element.

To simultaneously clamp and thereby seal the two parts, the recesses and the second interlocking elements are mutually congruent, so that on the outer circumference of the housing an interlocking element of a uniform appearance is formed, which can then be coupled to corresponding counterpart surfaces on the receiving head. In this embodiment, the outside diameter of the second interlocking elements corresponds to the outside diameter of the first interlocking elements, and the arc length of the second interlocking elements corresponds to the arc length of the axial recess in the first interlocking elements.

To further secure the filter system against leaks, particularly if the canister of the filter element breaks, at least one annular sealing element may be disposed between the canister and the housing. Any liquid escaping the filter element is then trapped in the gap between the inside of the cup-shaped housing and the canister. The annular sealing element may be a standard O-ring or an elastomer sealing collar that is formed onto the outer circumference of the filter element.

To interconnect the filter element and the housing in the correct position, the recesses in the first interlocking elements and the second interlocking elements engaging therein may be disposed in an unsymmetrical angular division, so that the user can combine the two parts only in the predefined position.

Unless the housing must have a specific angular position relative to the receiving head, the webs formed by the first and the second interlocking elements are disposed in a symmetrical angular division to facilitate mounting. This configuration may also be provided in combination with the asymmetrical arrangement of the first and second interlocking elements described above so that the filter element and the housing can then be positioned relative to each other only in a specific way, but the assembled filter element and housing can be fixed to the connection head in any angular position.

To facilitate removal of a filter element from the housing for disposal, the filter element may be provided with at least one fold-down handle element on the exposed end of the canister. Such a handle element is preferably formed by two semicircular partial handle elements made of synthetic resin material, which are flexibly interconnected by a film hinge along a diameter of the housing. This creates a centrally mountable disk-shaped body having large openings to enable connection with the inlet and outlet on the connection head on the one hand and can be easily gripped on the other. The two semicircles can be folded down on the foil hinge from their original position, perpendicularly to the longitudinal axis of the filter element.

The liquid filter system according to the invention is particularly suitable for a filter element comprising a filter insert member that is wound from a flat structure, i.e., one made of a pleated filter layer that is bonded to a cover layer on one side along its folded edges, as disclosed in principle in U.S. Pat. No. 6,004,462 (=DE 196 28 060). In contrast to conventional pleated filter insert members, the medium flows through not just primarily radially but also axially, so that the filter insert member as a whole is subject to large axial forces. Because the invention ensures a correct alignment of the filter element inside the housing, it is possible to provide support plates, etc. to absorb these axial forces on the pleated filter unit without unintentionally blocking the flow paths by incorrect alignment.

If the interlocking elements are to be coupled to the receiving head via a bayonet connection, it is particularly advantageous if at least one radially displaceable, flexibly supported detent pin is provided on the receiving head extending into the arcuate recesses in which the webs formed by the assembled first and second interlocking members are received. In this case, the webs should furthermore each have an inclined cam surface on at least one of their lateral edges for deflecting the detent pin element. If the housing with an installed filter element is inserted placed with its webs, which are uniformly made up of the assembled first and second interlocking elements, into the arcuate receiving grooves on the receiving head and is rotated through an angle relative to the center axis of the housing, the inclined cam surfaces on the interlocking elements push back the detent pin so that the housing can be turned until a tight connection is established between the housing and the receiving head. If, on the other hand, the user forgets to insert a filter element into the housing, this fact is not only visually detectable but a connection between the housing and the receiving head is actively prevented. In this case, the detent pin snaps into the recess that is located within, or next to, the first interlocking elements and is provided for receiving the second interlocking elements, so that the housing cannot be rotated all the way to its end position. The detent pin lies in the groove that extends axially to the lower edge of the housing, so that in this blocked position the housing can simply be axially removed again.

If axially acting spring elements are provided in addition between the end faces of the receiving head and the underside of the housing, the incorrectly mounted housing is rejected by the receiving head, so that in the blocked position the operator cannot leave the housing attached to the receiving head without a filter element.

BRIEF DESCRIPTION OF THE DRAWINGS

The invention will described in further detail hereinafter with reference to illustrative preferred embodiments shown in the accompanying drawing figures, in which.

DETAILED DESCRIPTION OF PREFERRED EMBODIMENTS

Figure 4:
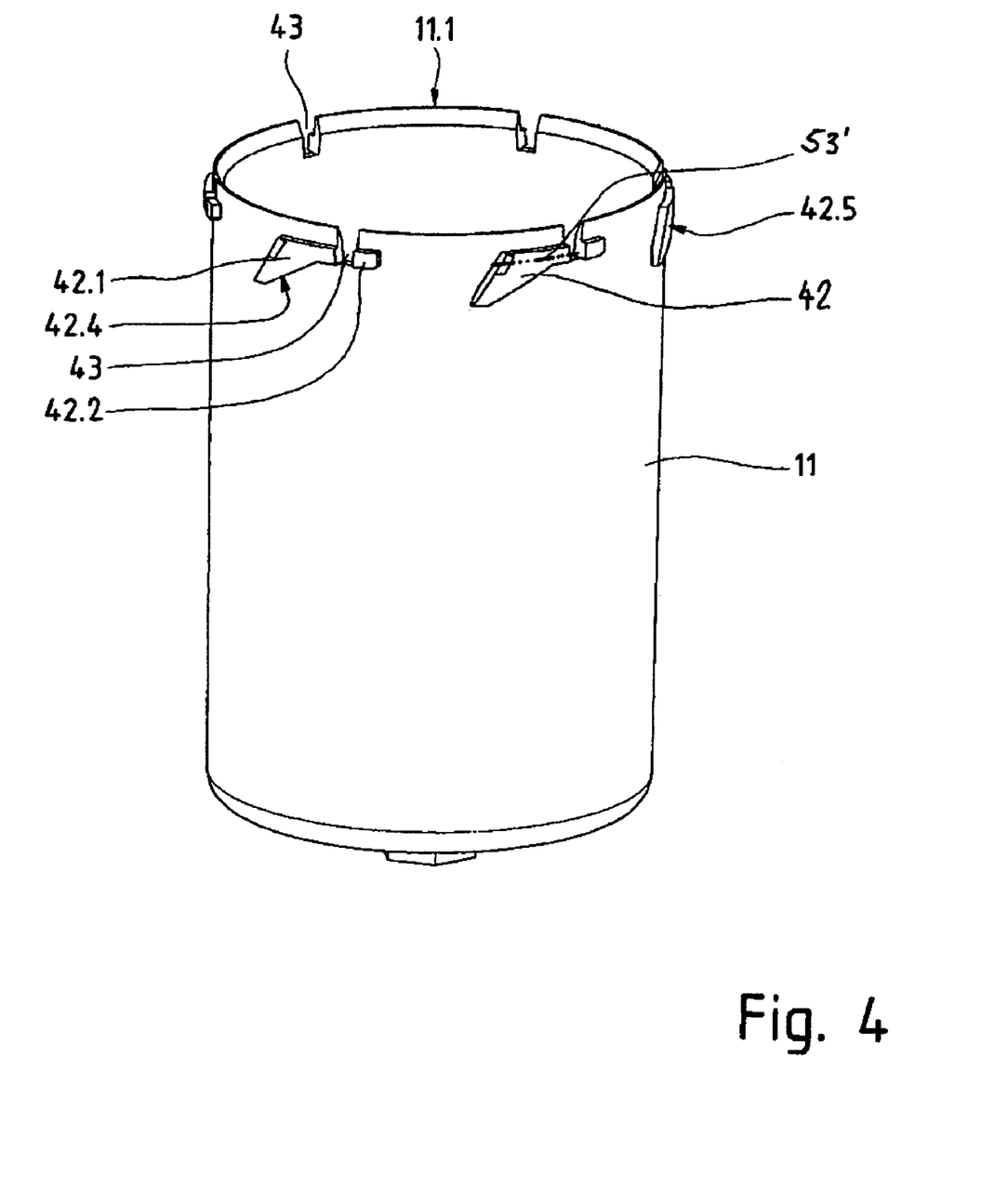
FIG. 4 is a perspective view of the housing.

FIG. 4 shows a housing 11 for the filter system according to the invention, which is substantially pot-shaped or cup-shaped. A bottom edge 11.1, shown pointing upwardly in FIG. 4, has a plurality of axially extending recesses 43 around its circumference. In the illustrated embodiment, a total of six first interlocking elements 42 are arranged near the bottom edge of the housing 11 and distributed around its outer circumference. The recesses 43 each extend far enough in the axial direction to interrupt or split the first interlocking elements 42. Thus, the first interlocking elements 42 are divided by the recesses 43 into partial areas 42.1 and 42.2. An inclined ramp or cam surface 42.4 is formed on the partial area 42.1.

Figure 1:
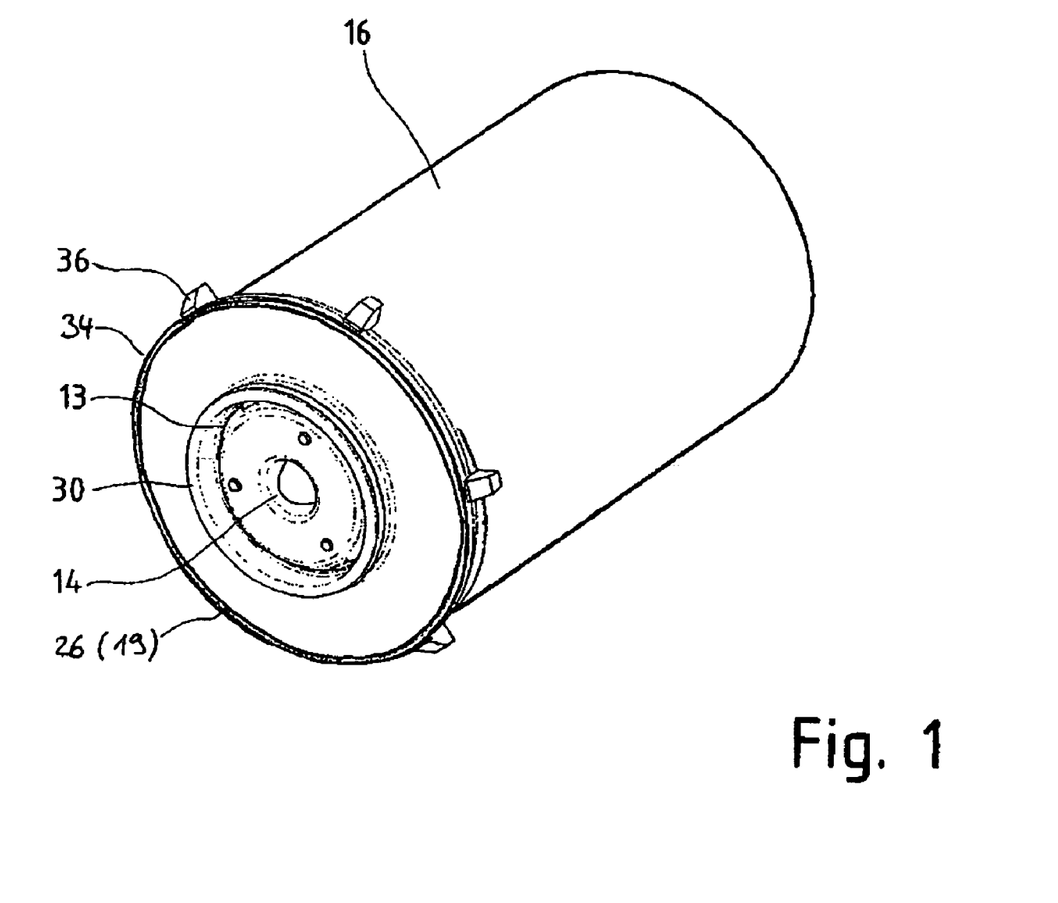
FIG. 1 is a perspective view of a filter element according to the invention.

FIG. 1 shows a bottom view of the filter element 19 with an annular closure face 26. A central support tube 14 is disposed in the center, which also acts as an inlet to the filter element 19. The liquid can flow out again through outlet openings 13, which are arranged in the region between the support tube 14 and a collar 30. The second interlocking elements 36 disposed around the outer circumference of the filter element are a significant aspect of the invention.

Figure 3:
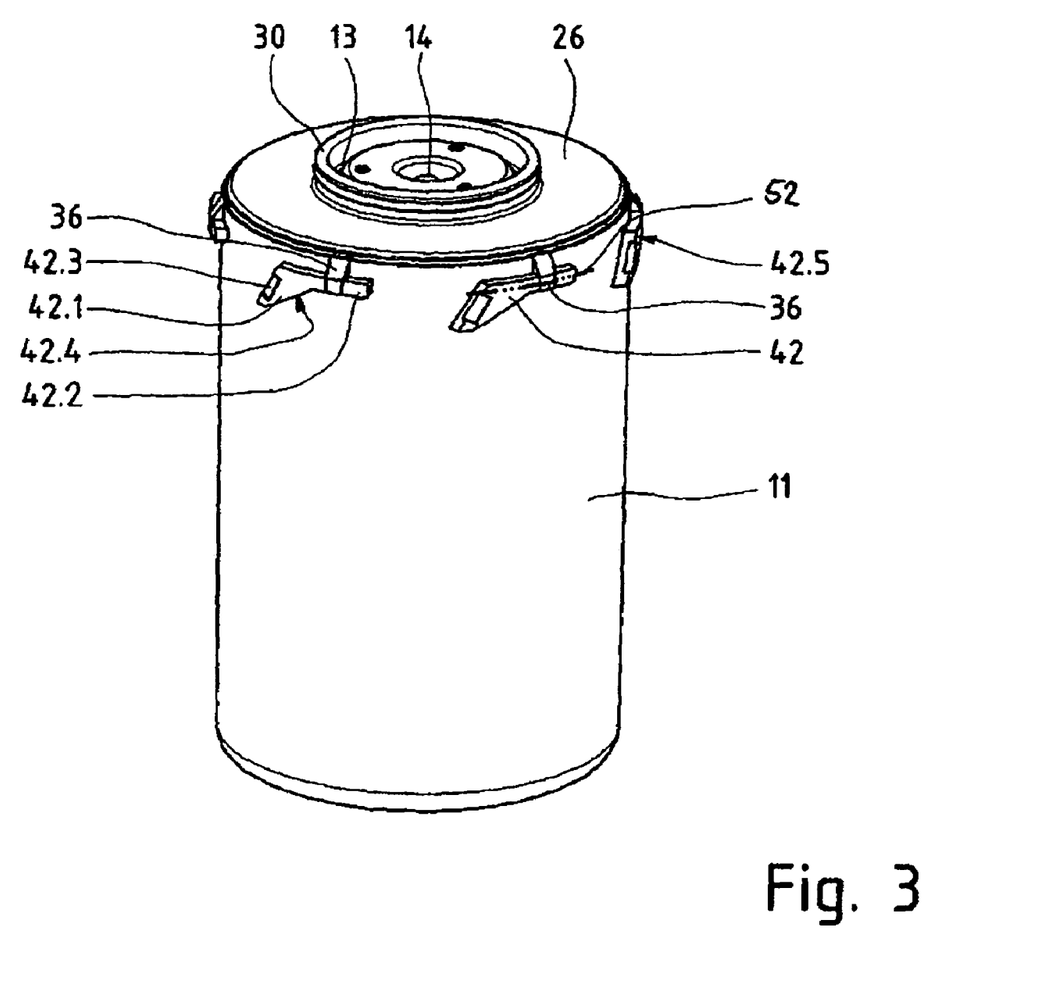
FIG. 3 is a perspective view of the housing and the filter element.

The interaction between the first and second interlocking elements 42, 36 according to the invention can be seen from the perspective view of the housing 11 with a filter element 19 inserted therein as shown in FIG. 3. The second interlocking elements 36 of the filter element 19 complement the first interlocking elements 42, which are interrupted by the recesses 43 in the housing 11, so that each set of first and second interlocking elements forms a uniform web on the outside of the housing 11. This seamless integration of the second interlocking elements 36 into the gap in the first interlocking elements results in a flush outer surface 42.5 on the webs.

Figure 2:
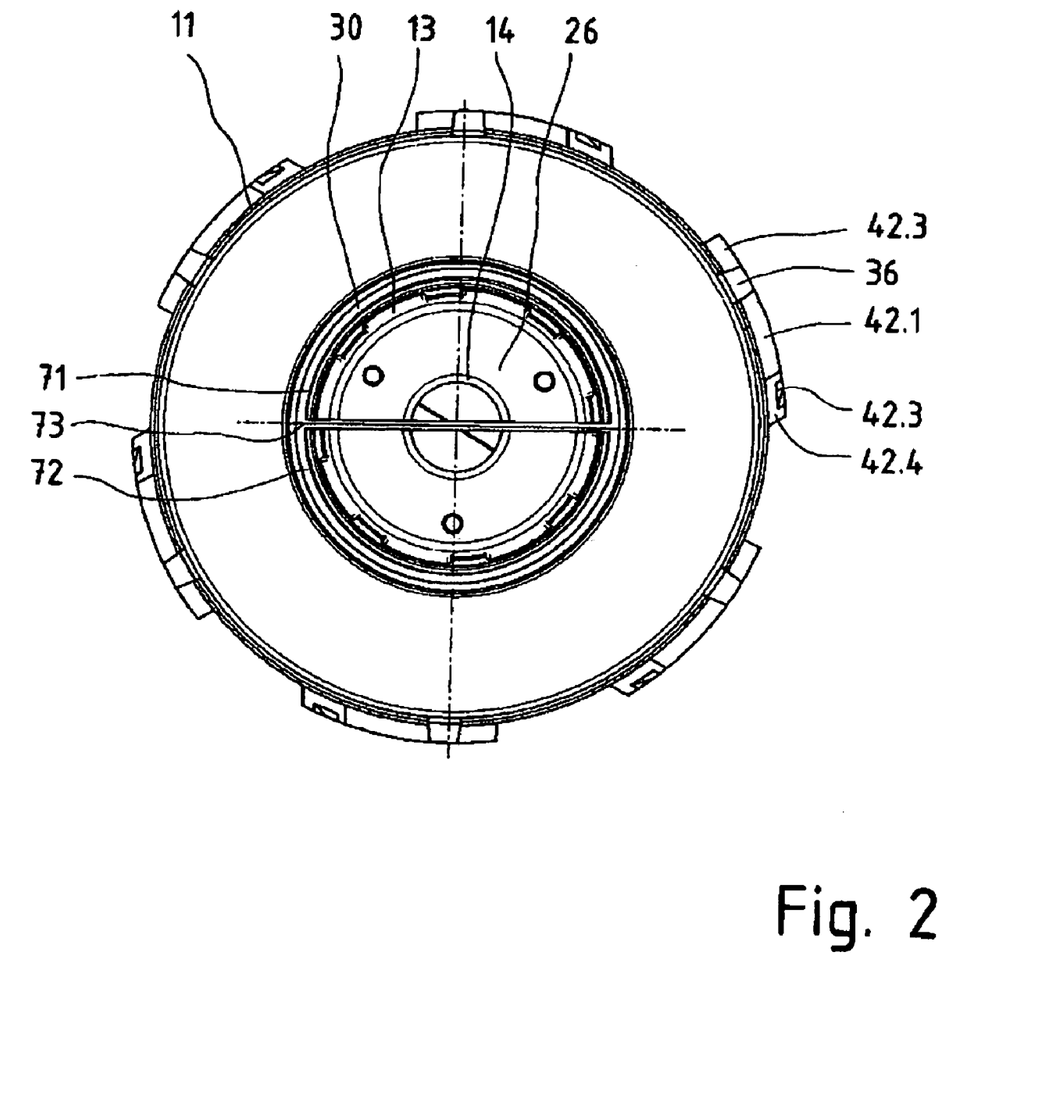
FIG. 2 is a bottom view of the housing and the filter element.

FIG. 2 shows a top view of the assembly of in FIG. 4. This figure again shows how the second interlocking elements 36 mate precisely with the recesses 43 in the first interlocking elements 42 in both the circumferential and radial extent, resulting in a uniform web, which in the illustrated preferred embodiment is provided to form a bayonet connection with a receiving head.

The collar 30 furthermore accommodates a handle element, which is initially disk-shaped and formed from two semicircular partial handle elements 71, 72, which are interconnected by their straight bases along a film hinge 73. The partial handle elements 71, 72 may be folded down or folded up at the foil hinge 73 so that they protrude from the underside of housing 11 and filter element 19 and can be easily gripped to facilitate removal of the filter element from the housing.

Figure 5:
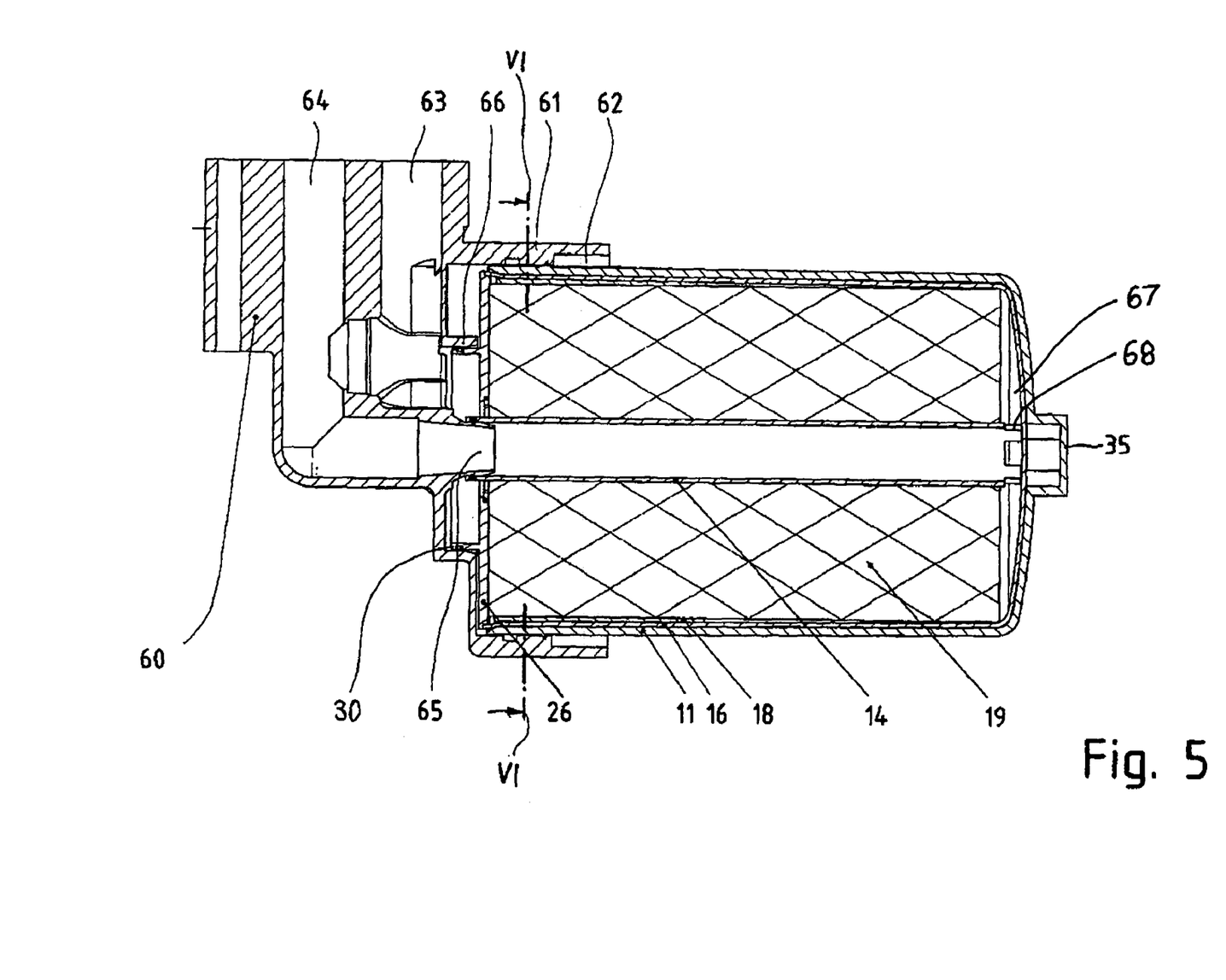
FIG. 5 is a longitudinal section of the liquid filter system according to the invention.

FIG. 5 depicts a complete liquid filter system according to the invention in which housing 11 with inserted filter element 19 is attached to a receiving head 61 having arcuate grooves 62 along its inner circumference in order to produce a bayonet connection with the interlocking elements on the outside circumference of housing 11. A flange housing 60 adjoining the receiving head 61 has integrated return and supply lines 63, 64, which lead to the return and inlet passages 13 and 14 of the filter element 19.

The support tube 14 has a sealing ring along its inner circumference at the end face and is slipped onto a conical fitting 65 between the housing 11 and the receiving head 61. At the end closure face 26, the collar 30 is also sealingly connected to the inner circumference of a ring 66, or an indentation in the receiving head 61, via an interposed sealing ring, so that the return area is likewise sealed relative to the environment.

The filter element 19 is surrounded by a cylindrical canister 16. The actual filter material, or the actual filter insert member, e.g., a wound compact filter insert made of pleated filter paper, is firmly connected to the canister 16 by a sealing compound 18.

The canister 16 creates a hollow space 67 above the filter insert member. In this area the support tube 14 is provided with cutouts 68. The liquid to be filtered is guided through the cutouts 68 into the hollow space 67 and then flows through the filter insert member 19.

Figure 6:
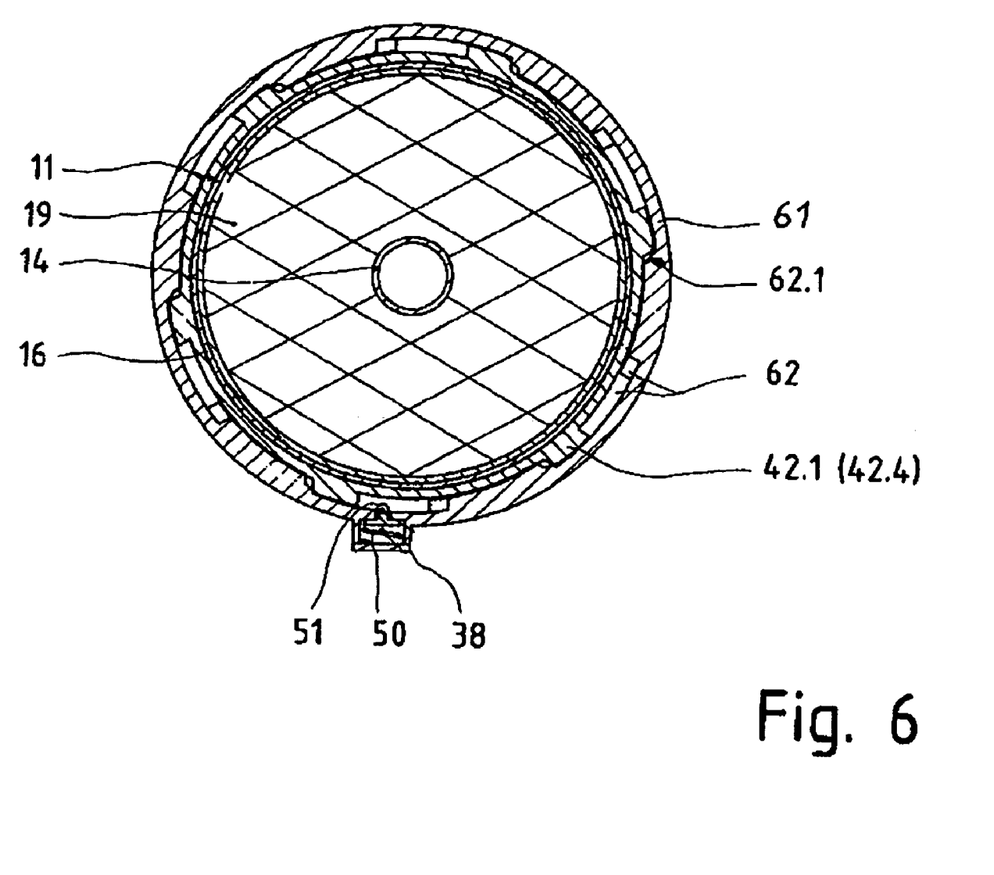
FIG. 6 is a cross section of the liquid filter system taken along line VI-VI in FIG. 5.

FIG. 6 is a section taken along line VI-VI in FIG. 5. The first interlocking elements 42 of the housing are cut away in their first partial area 42.1 with the inclined cam surfaces 42.4 and lie within the arcuate receiving grooves 62 of the receiving head 61. The receiving grooves 62 have slopes 62.1 to provide additional centering of the housing 11 and the filter element 19 relative to the receiving head 61 as the bayonet connection is locked.

A detent pin 51 extends into at least one of the receiving grooves 62 and is held in this position by a compression spring 50. To create room for the detent pin 51 an additional small housing 38 may be provided on the outside of the receiving head 61. The broken line 52 in FIG. 3 indicates the path of the detent pin 51 across the external face 42.5 of the assembled first and second interlocking elements 42, 36 if a filter element 19 is properly installed in the housing 11. The inclined cam surface 42.3 at the leading edge of the first interlocking element pushes the detent pin 51 radially outwardly so that the pin slides across the radially outer surface of the web formed by the assembled interlocking elements 42 and 36.

In contrast, if no filter element 19 is installed in the housing 11, the path of the detent pin 51 ends in the recess 43 within the first interlocking element 42 as indicated in FIG. 4 by the broken line 52'. The force of the spring 50 causes the detent pin 51 to snap into the recess 43 and thereby prevents further rotation of the housing 11. In this way, the housing 11 is prevented from being assembled to the receiving head 61 if no filter element is installed in the housing.

Figure 7:
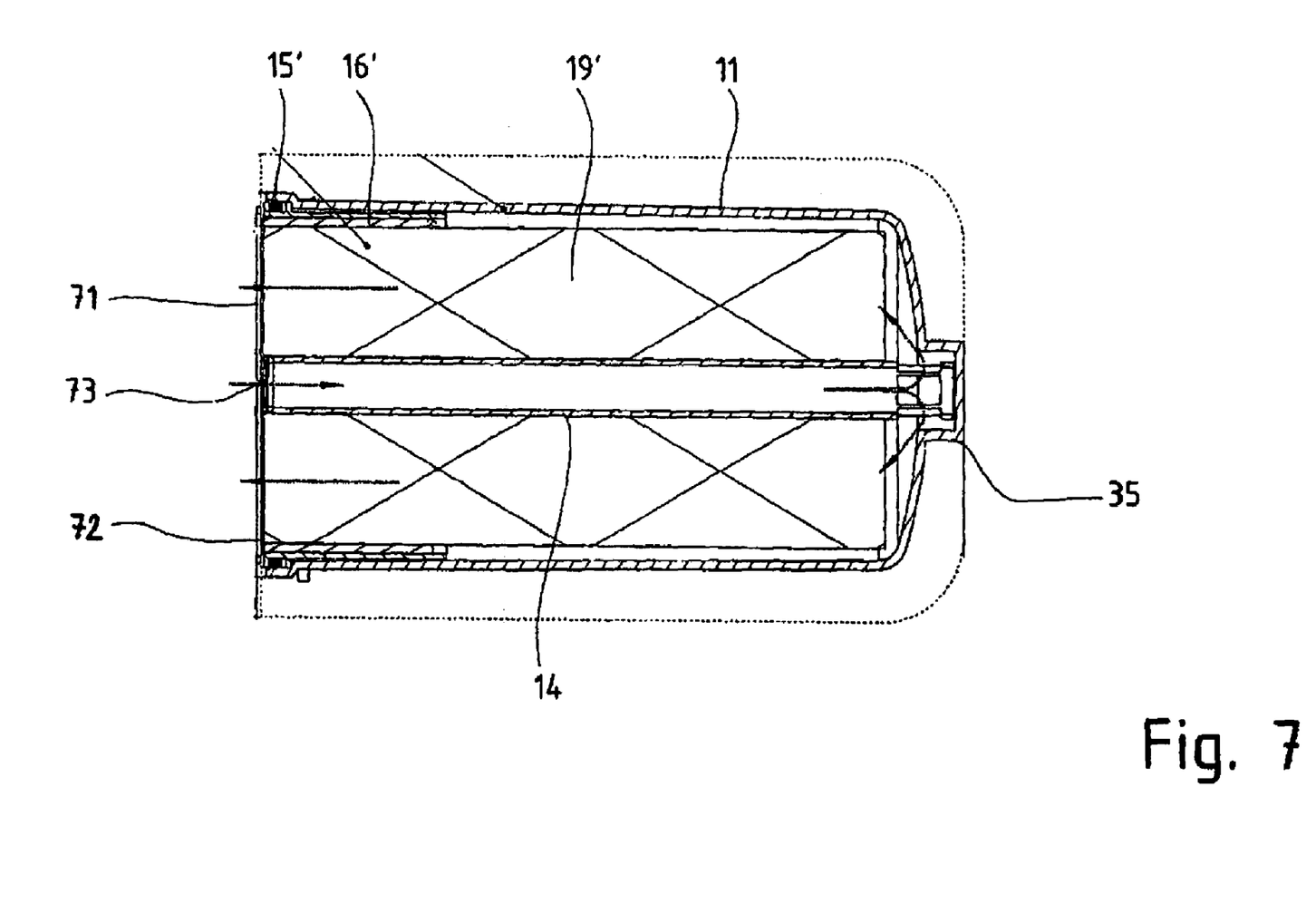
FIG. 7 is a longitudinal section of the housing and a second embodiment of a filter element according to the invention.

FIG. 7 again shows the housing 11. A second embodiment of a filter element 19', in which the canister 16' does not completely enclose the filter element 19, but is configured simply as a ring in the end region, is inserted into this housing. The filter element 19' is sealed relative to the housing 11 by an annular sealing element 15'. This partial canister 16' reduces the amount of plastic to be disposed of and is suitable particularly if the medium to be filtered is relatively clean to handle, e.g., gasoline or water with suspended solids. In this case, the otherwise advantageous encapsulation of the filter element 19 in a liquid-tight canister depicted in FIGS. 1 to 6 may be omitted to save material.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A liquid filter system comprising receiving head, a cup-shaped housing releasably connectable to the receiving head, and a filter element disposed inside the housing, wherein the housing is provided with a plurality of first interlocking elements that extend across at least a portion of the outer circumference of the housing or across a lower edge of the housing, each said interlocking element being interrupted by at least one axially extending recess or having a laterally adjoining axially extending recess, and wherein said filter element comprises a canister provided on an outer surface thereof or at a lower edge thereof with a plurality of second interlocking elements which are received in the axially extending recesses of the first interlocking elements when the filter element is installed in the housing.

2. A liquid filter system according to claim 1, wherein the first and second interlocking elements complement each other to form a web with an inclined cam surface on the outer circumference of the housing, and each such web is received into an arcuate recess in the receiving head to produce a bayonet connection between the webs and the arcuate recesses.

3. A liquid filter system according to claim 1, wherein said second interlocking elements have an outside diameter which corresponds to the outside diameter of the first interlocking elements, and an arc length which corresponds to the arc length of the axially extending recess of the first interlocking elements.

4. A liquid filter system according to claim 1, wherein at least one annular sealing element is disposed between the canister of the filter element and the cup-shaped housing.

5. A liquid filter system according to claim 4, wherein the annular sealing element comprises an elastomer sealing collar formed at the outer circumference of the filter element.

6. A liquid filter system according to claim 1, wherein the axially-extending recesses in the first interlocking elements and the second interlocking elements are arranged in an unsymmetrical angular distribution around the circumference of the filter.

7. A liquid filter system according to claim 6, wherein the webs formed by the first and second interlocking elements are arranged in a symmetrical angular distribution around the circumference of the filter.

8. A liquid filter system according to claim 1, wherein the filter element comprises at least one handle element on the inflow side of the canister.

9. A liquid filter system according to claim 8, wherein said at least one handle element comprises a pair of semicircular partial handle elements, which are flexibly interconnected by a film hinge along a diameter of the filter element.

10. A liquid filter system according to claim 1, wherein the filter element comprises a filter insert member wound from a semipermeable flat structure consisting of a pleated filter layer, which on one side is bonded to a cover layer along its folded edges.

11. A liquid filter system according to claim 2, wherein at least one radially displaceable, spring-mounted detent pin is provided on the receiving head and protrudes into an arc-shaped recess, and the webs each have an inclined cam surface on at least one lateral edge for deflecting the detent pin.

12. A filter system according to claim 1, wherein said filter is an oil filter or fuel filter for an internal combustion engine.

13. A filter system according to claim 1, wherein said canister is a liquid-tight canister which completely encloses the filter element.

* * * * *